United States Patent
Odenwald, Jr. et al.

(10) Patent No.: US 7,958,282 B2
(45) Date of Patent: Jun. 7, 2011

(54) METHOD, APPARATUS AND SYSTEM FOR SERIAL ATTACHED SCSI (SAS) ZONING MANAGEMENT OF A DOMAIN USING INITIATOR ISOLATION

(75) Inventors: Louis Henry Odenwald, Jr., Wichita, KS (US); Roger Hickerson, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 204 days.

(21) Appl. No.: 12/211,139

(22) Filed: Sep. 16, 2008

(65) Prior Publication Data

US 2010/0070662 A1   Mar. 18, 2010

(51) Int. Cl.
*G06F 3/00* (2006.01)
*G06F 13/00* (2006.01)
(52) U.S. Cl. ............................. 710/42; 710/8; 710/36
(58) Field of Classification Search .................. None
See application file for complete search history.

(56) References Cited

U.S. PATENT DOCUMENTS

| 7,668,925 | B1 | 2/2010 | Liao et al. |
| 2007/0162592 | A1 | 7/2007 | Marks et al. |
| 2008/0244620 | A1* | 10/2008 | Cagno et al. ............... 719/326 |
| 2009/0083423 | A1 | 3/2009 | Basham et al. |
| 2009/0094664 | A1* | 4/2009 | Butler et al. .................. 726/1 |

OTHER PUBLICATIONS

Liao, Heng, Managing Access Control Through SAS Zoning, 2005, PMC-Sierra [online, accessed on Jan. 29, 2011], URL: http://www.scsita.org/aboutscsi/sas/WP_PMC_Sierra_SAS_0905.pdf.*

* cited by examiner

*Primary Examiner* — Tariq Hafiz
*Assistant Examiner* — Scott Sun

(57) ABSTRACT

Embodiments of the invention include a method and apparatus for managing SAS zoning using initiator isolation. The method includes assigning initiator devices in the SAS domain to a first initiator zone group, assigning target devices in the SAS domain to a second target zone group, and establishing an access control policy in which each of the initiator devices assigned to the first initiator zone group can communicate with each of the target devices assigned to the second target zone group but no initiator devices assigned to the first initiator zone group can communicate with any other initiator devices assigned to the first initiator zone group. Assignment of devices can be based on attachment information associated with each device, such as the ZPSDS entry point of the device, the SAS address of the device, and the phy of the zoning expander device in the SAS domain that is closest to the device.

20 Claims, 4 Drawing Sheets

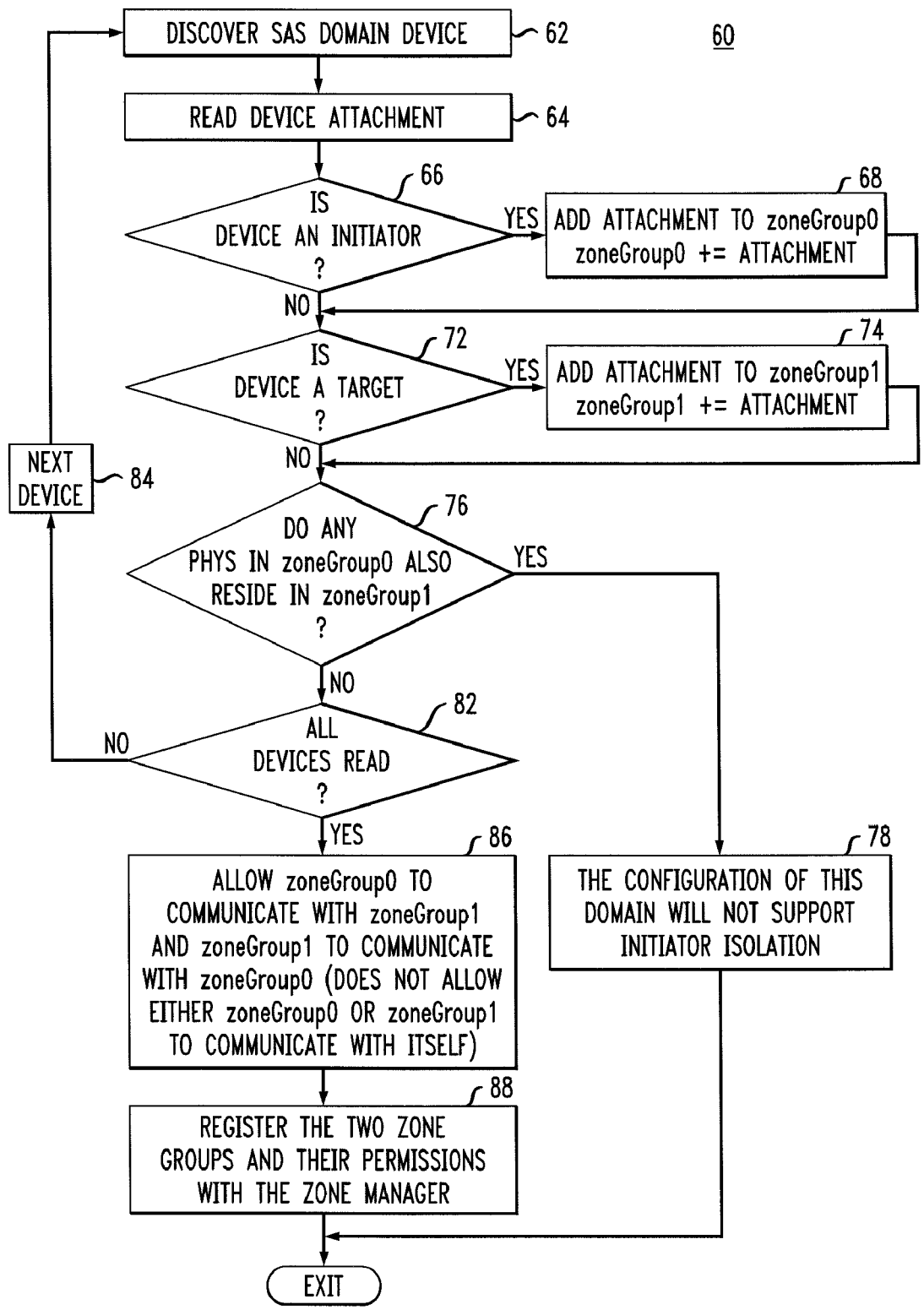

METHOD, APPARATUS AND SYSTEM FOR SERIAL ATTACHED SCSI (SAS) ZONING MANAGEMENT OF A DOMAIN USING INITIATOR ISOLATION

BACKGROUND OF THE INVENTION

1. Field of the Invention

The invention relates to the Serial Attached SCSI (SAS) data transfer technology protocol. More particularly, the invention relates to methods, devices and system architectures for SAS Zoning management.

2. Description of the Related Art

SCSI refers to the Small Computer Systems Interface set of electronic interface standards that allow various devices to communicate with one another, e.g., computers to communicate with peripheral devices. Serial Attached SCSI (SAS) refers to a point-to-point serial protocol for data transfer technology between computer network storage devices, such as hard drives and tape drives. An SAS domain is an input/output (I/O) system that includes a set or network of SAS devices that communicate with one another.

SAS provides switching capability using (SAS) expanders, which act as switches between SAS initiators (e.g., hosts) and SAS targets (e.g., end devices, such as disk drives), and are fully capable of connecting multiple SAS hosts to multiple SAS end devices. Accordingly, SAS is being explored as a possible mechanism for connecting large groups of targets in various storage area network (SAN) applications, and other applications. Within such SAN applications, the management of SAS domains is a key element to the success of SAS implementation within the network systems that make up the SAS domains.

In general, an SAS initiator device directs information to an SAS target device through ports of one or more SAS expanders in the SAS domain. A port can include one or more physical links, or phys, in an SAS domain. A port can use a single phy or, if the port is configured as a wide port, can use multiple phys logically grouped to provide higher bandwidth.

The SAS specifications presently support zoning capabilities within an SAS domain. SAS zoning is implemented by one or more (typically a set of) zoning expanders that cooperate to define the zoned service delivery subsystem (ZSDS). The zoning expanders, i.e., SAS expanders with zoning capabilities, control whether a phy is permitted to open a connection to or participate in a connection with another phy. Such control determines whether two SAS devices attached to the SAS zoning expander through the phys are able to communicate. Such communication is important for sharing storage resources among multiple servers, including the ability to prevent servers from connecting to other servers and associated storage devices of the other servers.

SAS zoning expanders and phys are assigned zone groups. A zone group is a set of phys in a zoned portion of a service delivery subsystem (ZPSDS) that can have the same access permissions. A zoned portion of a service delivery subsystem (ZPSDS) is a group of zoning expander devices that cooperate to control access between phys. When SAS exchanges are routed through SAS zoning expanders, the SAS zoning expanders may verify that the phys (e.g., the SAS devices coupled to the phys) are permitted to participate in the connection. Also, the SAS zoning expanders may deny the connection if the phys are not permitted to participate in the connection.

Conventionally, applications designed to manage SAS zoning allow each phy on the edge of the ZPSDS to be assigned into a zone group, then allow permissions to be established and assigned for the zone groups to communicate with one another. Such a relatively direct SAS zoning approach often poses several problems for the management application.

For example, application administrators typically think about visibility among devices, such as to which target devices a particular initiator device should have access. Such approach is analogous to Fiber Channel (FC) World Wide Name (WWN) based zoning, and most often is used in dynamic topologies where changes sometimes may occur. Also, application administrators sometimes think in terms of connectors or ports, such as to what other connectors should devices attached to a particular connector have access. Such approach is analogous to Fiber Channel (FC) Port based zoning, and most often is used in static topologies. Sometimes application administrators want to implement a specific strategy, such as preventing access by a first SAS device to another SAS device. In all of these cases, conventionally, the SAS zoning application has to deconstruct the zoning requirements, i.e., break down the device or connector model to the phy level, to be able to map phys into zone groups and then to assign zone group permissions.

Moreover, all of the target devices in the SAS domain are not always attached directly to the ZPSDS. Therefore, target devices sometimes are forced to share a common ZPSDS entry point associated with the same zone group. When this occurs, the SAS zoning application must bundle target devices together based on their ZPSDS attachment points to see if zoning requirements can be realized on a particular topology before breaking down the device or connector model to the phy level to map phys into zone groups and assign zone group permissions.

SUMMARY OF THE INVENTION

The invention is embodied in a method, apparatus and system for managing SAS zoning, using initiator isolation, without requiring the SAS zoning management requirements to be deconstructed down to the phy level. The SAS zoning management application includes a zoning strategy based on the various initiator devices in the SAS domain having access to all target devices in the SAS domain, but not having access to any other initiator devices. Such zoning management eliminates any possible difficulties that an initiator device sometimes can cause for other initiator devices to which the initiator device is communicating. The method includes assigning the initiator devices in the SAS domain to a first initiator zone group, assigning the target devices in the SAS domain to a second target zone group, and establishing an access control policy in which each of the initiator devices assigned to the first initiator zone group can communicate with each of the target devices assigned to the second target zone group but no initiator devices assigned to the first initiator zone group can communicate with any other initiator devices assigned to the first initiator zone group. The assignment of devices into their respective zone group can be based on attachment information associated with the device. Such attachment information can include the zoned portion of a service delivery subsystem (ZPSDS) entry point of the device, the SAS address of the device, and the phy of the zoning expander device in the SAS domain that is closest to the device.

BRIEF DESCRIPTION OF THE DRAWINGS

FIG. 4 is a block diagram of a method for SAS domain zoning using initiator isolation according to embodiments of the invention.

DETAILED DESCRIPTION OF EXEMPLARY EMBODIMENTS

Figure 1:
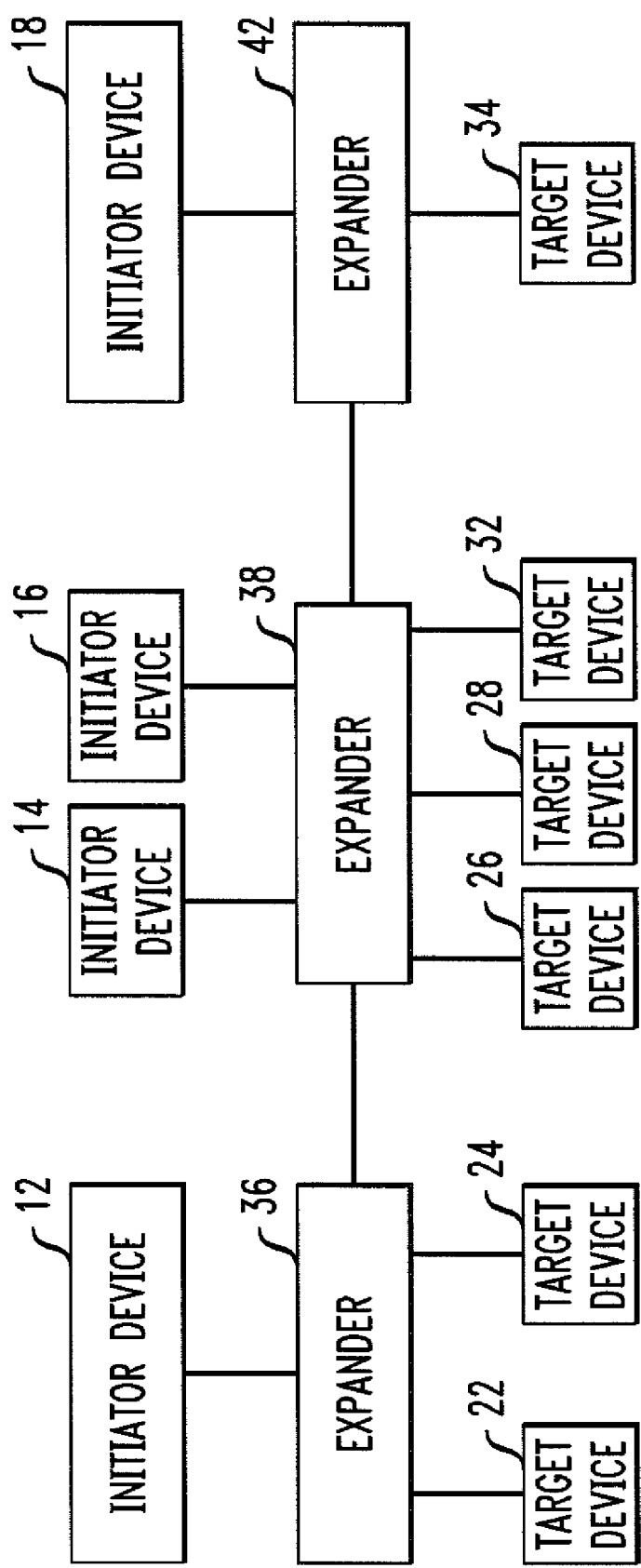
FIG. 1 is a schematic view of a conventional SAS domain that supports conventional SAS zoning capabilities.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

An SAS Zoning management application is described herein that simplifies the work of SAS domain management operations. The initiator isolation applications that are included as part of the methods, devices and systems described herein allow an SAS domain administrator to interface with the particular SAS zoning applications without requiring the administrator to deconstruct the zoning requirements down to the phy level. The initiator isolation applications within the SAS zoning management methods, devices and systems described herein configure a zoning strategy in which initiator devices in the SAS domain have access to all target devices, but cannot access other initiator devices. Such zoning strategy is useful because initiator devices sometimes cause difficulties for other initiator devices with which they can communicate, therefore isolating each initiator device from one another eliminates such potential problems.

Referring now to FIG. 1, shown is a schematic view of a conventional SAS domain 10 that supports conventional SAS zoning capabilities. The SAS domain 10 includes one or more SAS initiators or initiator devices 12, 14, 16, 18, which can be SAS hosts or other suitable SAS initiator devices. The SAS domain 10 also includes one or more SAS targets or target devices 22, 24, 26, 28, 32, 34, which can be SAS end devices, such as disk drives, or other suitable SAS target devices. The SAS domain 10 also includes one or more SAS zoning expanders or expander devices 36, 38, 42, which are SAS expander devices with SAS zoning capabilities.

Each of the SAS zoning expanders 36, 38, 42 typically is coupled to one or more initiator devices 12, 14, 16, 18, and coupled to one or more target devices 22, 24, 26, 28, 32, 34. The SAS zoning expanders 36, 38, 42 also can be coupled to each other, e.g., as shown. As discussed hereinabove, an SAS expander acts as a switch between SAS initiators and SAS targets, e.g., in a manner that allows multiple SAS initiators to connect to and communicate with multiple SAS targets. Thus, SAS expanders can allow SAS exchanges to be routed between any of the SAS initiator devices and any of the SAS target devices within the SAS domain 10.

Each SAS initiator device, SAS target device, and SAS zoning expander within the SAS domain 10 has one or more physical links or physical link layers, known as phys. Connections between two or more SAS devices are made through the phys of the SAS devices. Connections may be routed between SAS devices through one or more of the SAS zoning expanders 36, 38, 42. That is, each of the SAS zoning expanders 36, 38, 42 typically are configured to control whether a device phy is permitted to open a connection to or participate in a connection with another device phy. Also, the SAS zoning expanders 36, 38, 42 define or cooperate to define a zoned service delivery subsystem (ZSDS) within the SAS domain 10. Phys of a particular SAS zoning expander can be assigned a corresponding zone group. The SAS zoning expanders 36, 38, 42 can include zoning capabilities enabled according to the SAS specifications and enhanced by the features and aspects of applications according to embodiments of the invention, as will be described in greater detail hereinbelow.

For appropriate SAS domain management, devices associated with the SAS domain management architecture should be able to execute various management applications that uniquely identify various domains within the network arrangement and perform various domain management functions within those domains. For example, an application or service that manages SAS domains can be running on a zone manager or work station within the network. The SAS domain management application or service can be connected to a single domain via an in-band connection, e.g., through an SAS host bus adapter (HBA) resident on the zone manager and/or the workstation. Alternatively, the SAS domain management application or service can be connected via an out-of-band connection, e.g., over an Ethernet connection to an expander or switch. According to embodiments of the invention, an SAS domain management application or service can include an SAS zoning management application with initiator isolation, e.g., an initiator isolation application that includes one or more specialized algorithms (or wizards), residing at least partially within the zone manager and/or the work station.

Figure 2:
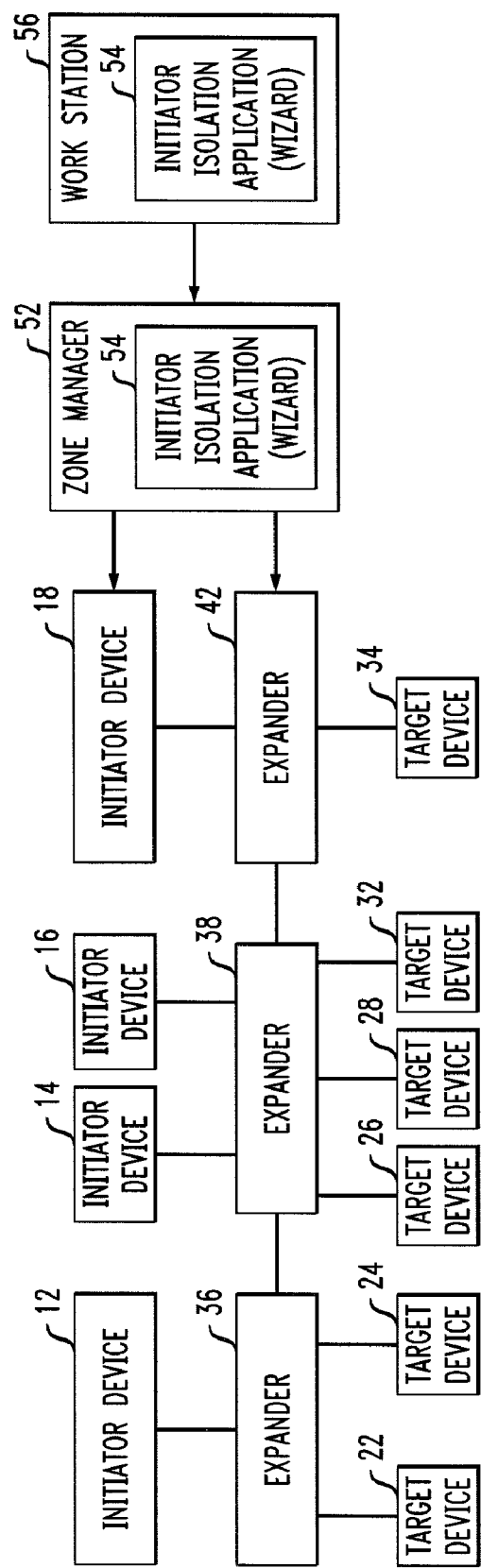
FIG. 2 is a schematic view of an SAS domain including or having coupled thereto an SAS zoning management application according to embodiments of the invention.

For example, referring now to FIG. 2, shown is a schematic view of an SAS domain 50 including or having operably coupled thereto an in-band SAS zoning management application with initiator isolation according to embodiments of the invention. The SAS domain 50 can include a zone manager 52 operably coupled to one or more of the initiator devices 12, 14, 16, 18 and/or one or more of the SAS zoning expanders 36, 38, 42, e.g., via one or more suitable in-band connections, such as through an HBA bus adaptor (not shown) residing on the zone manager 52. The zone manager 52 includes the appropriate interface or interfaces for operably coupling to one or more of the initiator devices 12, 14, 16, 18 and/or one or more of the SAS zoning expanders 36, 38, 42. The zone manager 52 also can include appropriate memory, controllers and/or other components that can include at least a portion of the initiator isolation applications 54 and methods according to embodiments of the invention. Alternatively, at least a portion of the initiator isolation applications 54 and methods according to embodiments of the invention can be provided by a work station operably coupled to the zone manager.

Figure 3:
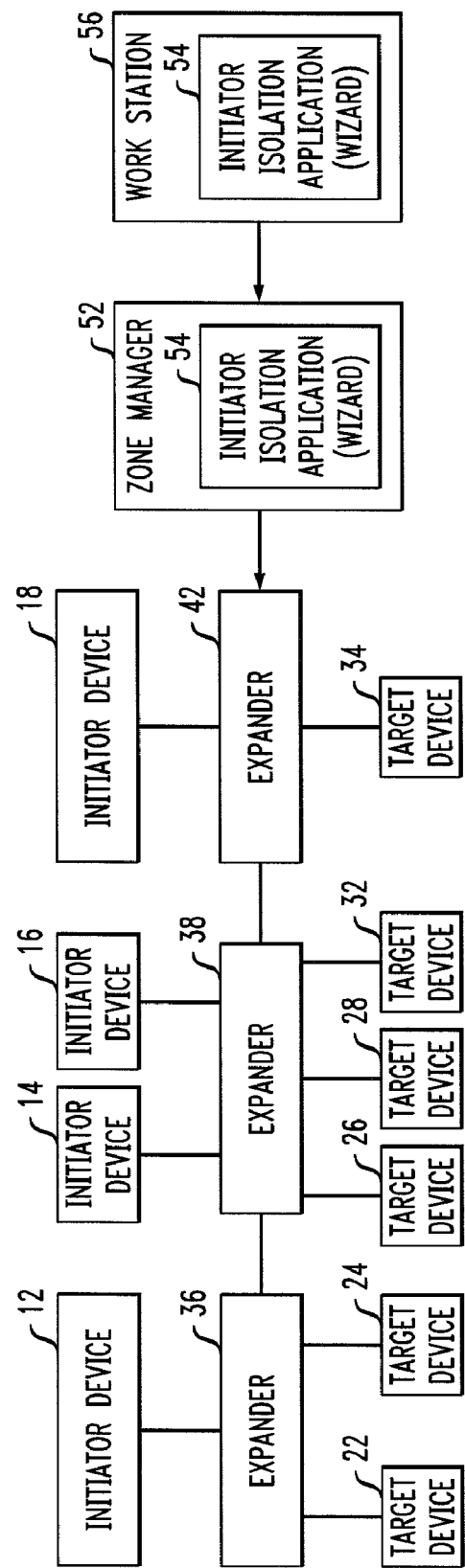
FIG. 3 is a schematic view of an SAS domain including or having coupled thereto an SAS zoning management application according to alternative embodiments of the invention.

Alternatively, referring now to FIG. 3, shown is a schematic view of the SAS domain 50 including or having operably coupled thereto an out-of-band SAS zoning management application with initiator isolation according to embodiments of the invention. The SAS domain 50 can include a zone manager 52 coupled to one or more of the SAS zoning expanders 36, 38, 42, e.g., via one or more suitable out-of-band connections, such as via an Ethernet connection or switch. The zone manager 52 includes the appropriate interface or interfaces for operably coupling to one or more of the SAS zoning expanders 36, 38, 42. Also, as discussed hereinabove, the zone manager 52 can include appropriate memory, controllers and/or other components with at least a portion of the initiator isolation applications 54 and methods or, alternatively, at least a portion of the initiator isolation applications 54 and methods can be provided by a work station 56 operably coupled to the zone manager 52.

One or more of the zone manager 52 and the work station 56 can be comprised partially or completely of any suitable structure or arrangement, e.g., one or more integrated circuits. Also, it should be understood that the zone manager 52 and the work station 56 each include other components, hardware and software (not shown) that are used for the operation of other features and functions of the respective devices not specifically described herein. All relevant portions of one or both of the zone manager 52 and the work station 56 can be partially or completely configured in the form of hardware circuitry and/or other hardware components within a larger device or group of components. Alternatively, all relevant portions of one or both of the zone manager 52 and the work station 56 can be partially or completely configured in the form of software, e.g., as processing instructions and/or one or more sets of logic or computer code. In such configuration, the logic or processing instructions typically are stored in a memory element or a data storage device. The data storage device typically is coupled to a processor or controller, and the controller accesses the necessary instructions from the data storage element and executes the instructions or transfers the instructions to the appropriate location within the respective device.

According to embodiments of the invention, SAS zoning management including initiator isolation applications 54 involves a zoning strategy based on initiator devices in a particular SAS domain having access to all target devices in the SAS domain, but not having access to any other initiator devices in the SAS domain. The use of this zoning strategy eliminates any possible difficulties that an initiator device sometimes can cause for other initiator devices due to communications therebetween.

The initiator isolation application 54 determines if a particular SAS domain of interest is capable of being configured according to the initiator isolation SAS zoning management strategy. That is, in general, the initiator isolation application 54 determines if any initiator device and target device in the SAS domain of interest are attached to the same zoned portion of a service delivery subsystem (ZPSDS) at the same point and share a common ZPSDS entry point. If any one initiator device and any one target device are found to be attached to the same ZPSDS at the same point and share a common ZPSDS entry point, the SAS domain has a topology that is not capable of supporting the initiator isolation SAS zoning management strategy. If not at least one initiator device and at least one target device are attached in this manner, the SAS domain has a topology that is capable of supporting the initiator isolation SAS zoning management strategy. Such determination can be at any suitable time during the management of the SAS domain.

For an SAS domain with a topology that can support the initiator isolation SAS zoning management strategy according to embodiments of the invention, the initiator isolation application 54 builds two zone groups, a first zone group for the initiator devices and a second zone group for the target devices. The initiator isolation application 54 then scans through the SAS domain to discover or recognize the initiator devices and target devices within the SAS domain. The initiator isolation application 54 then assigns all of the ZPSDS entry point phys upstream from the initiator devices into the first zone group and all of the ZPSDS entry point phys upstream from the target devices into the second zone group.

The initiator isolation application 54 then establishes or sets up an access control policy, including appropriate permissions, to allow the first and second zone groups to make connections with each other to allow devices within each zone group to communicate with devices in the other zone group. However, the access control policy set up by the initiator isolation application 54 also includes appropriate restrictions that prohibit phys in each of the zone groups to make connections with other phys in the same zone group. Thus, the access control policies set up by the initiator isolation application 54 effectively allow initiator devices throughout the domain to see and connect with target devices, but not other initiator devices. Although target devices throughout the domain also cannot connect with other target devices in the domain, such is not a concern compared to the elimination of possible communication difficulties caused by initiator devices being able to connect with other initiator devices.

The initiator isolation application 54 allows for effective SAS zoning management of the SAS domain without having to deconstruct the SAS zoning management requirements down to the phy level. As discussed hereinabove, conventional SAS zoning applications typically have to deconstruct the zoning requirements, i.e., break down the device or connector model to the phy level, to be able to map phys into zone groups and then assign zone group permissions. The initiator isolation application 54 according to embodiments of the invention does not require such deconstruction.

As an example, referring now to FIG. 4, shown is a block diagram of a method 60 for SAS domain zoning using an initiator isolation application 54 according to embodiments of the invention. As discussed hereinabove, all or a portion of the initiator isolation application 54 can reside within and be executed by the zone manager 52 and/or the work station 56. The necessary initiator isolation instructions, commands, permissions, restrictions and other access control policy information involved can be transmitted to one or more initiator devices and expanders, as necessary, via an appropriate connection between the zone manager 52 and the particular domain devices.

The method 60 includes a step 62 of discovering or recognizing a first end device within the SAS domain. The device discovery step 62, along with the other steps of the method 60, described hereinbelow, can be performed as part of an overall topology discovery process that typically is performed when the domain topology changes, e.g., a new device is added, removed or lost. The device discovery step 62 typically is one of the first steps in an iterative process of eventually discovering or recognizing all devices in the domain. The device discovery step 62 can discover any device within the domain, e.g., any initiator device or any target device, as part of this iterative discovery process.

The method 60 includes a step 64 of reading the attachment of the discovered device. Once a particular device is discovered or recognized as part of the domain, the method 60 reads the attachment of the device. The device attachment includes various information about the device and its identity within the domain, such as the ZPSDS entry point of the device and the SAS address of the device. The ZPSDS entry point of the device includes the phys of the zoning expander that is closest to the device (within the domain), and is another component of the attachment.

The method 60 also includes a step 66 of determining whether or not the device is an initiator device. Based on the attachment information associated with the device, or other appropriate information, the determination step 66 determines if the device is an initiator device. If the device is determined to be an initiator device (Y), the method 60 performs a step 68 of adding the attachment of the (initiator) device to a first (initiator) zone group. If the step 68 is being performed for the first time as part of the method 60, the adding step 68 can include establishing or creating the first (initiator) zone group and adding the attachment of the (initiator) device to the first (initiator) zone group. If the device is determined to not be an initiator device (N), the method 60 performs the next step of the method 60.

The method 60 also includes a step 72 of determining whether or not the device is a target device. Based on the attachment information associated with the device, or other appropriate information, the determination step 72 determines if the device is a target device. If the device is determined to be a target device (Y), the method 60 performs a step 74 of adding the attachment of the (target) device to a second (target) zone group. If the step 74 is being performed for the first time as part of the method 60, the adding step 74 can include establishing or creating the second (target) zone group and adding the attachment of the (target) device to the second (target) zone group. If the device is determined to not be a target device (N), the method 60 proceeds to the next step in the method 60.

It should be understood that the target device determining step 72 (and possibly the adding step 74) can be performed before the initiator device determining step 66 (and possibly the adding step 68), as long as both determining steps 68, 72 are performed.

The method 60 also includes a step 76 of determining whether any phys residing in the first (initiator) zone group also reside in the second (target) zone group. For example, such can occur if a separate initiator device and target device were connected to a non-zoning expander that was in turn attached to the ZPSDS. Such connection arrangement would result in both the initiator device and the target device sharing the same ZPSDS entry point.

If the determining step 76 determines that at least one phys residing in the first (initiator) zone group also resides in the second (target) zone group (Y), the method 60 determines that the configuration of the domain topology will not support initiator isolation according to embodiments of the invention. Such determination is shown generally as a determination step 78. Once the determination step 78 has been performed, the method 60 ends without initiator isolation according to embodiments of the invention being performed.

If the determining step 76 determines that there are no phys residing in the first (initiator) zone group that also reside in the second (target) zone group (N), the method 60 performs a step 82 of determining whether or not the attachments of all devices in the domain (both initiator devices and target devices) have been read. If the determining step 82 determines that there are devices remaining in the domain whose attachments have not been read (N), the method 60 performs a step 84 of proceeding to another device in the domain whose attachment has not yet been read. The method 60 then returns to the step 62 of discovering or recognizing the device chosen by the step 84 as a device in the domain whose attachment has yet to be been read. The method 60 then performs the attachment reading and determining steps, e.g., as discussed hereinabove.

If the determining step 82 determines that the attachments of all devices in the domain have been read (Y), the method 60 performs a step 86 of isolating the devices within each of the first (initiator) and second (target) zone groups. For example, the isolation step 86 establishes the necessary access control policies to allow each (initiator) device in the first (initiator) zone group to communicate with each (target) device in the second (target) zone group. However, the access control policies established by the isolation step 86 also prevent devices within the same zone group from communicating with each other. That is, none of the (initiator) devices within the first (initiator) zone group can communicate with any other (initiator) devices in the first (initiator) zone group. Also, none of the (target) devices within the second (target) zone group can communicate with any other (target) devices in the second (target) zone group.

According to embodiments of the invention, the isolation step 86 provides and establishes the necessary permissions, restrictions and other access control policies for allowing each of the devices in a particular zone group to communicate with all devices in the other zone group. Also, the isolation step 86 provides and establishes the necessary permissions, restrictions and other access control policies for isolating all of the devices in each zone group from all other devices in the same zone group.

The method 60 also can include a step 88 of registering the two zone groups and their respective access control policies permissions with the zone manager 52. For example, the registering step 88 can register each of the (initiator) devices in the first (initiator) zone group, and the particular permissions, restrictions and other access control policies of each initiator device, with the zone manager 52. Also, the registering step 88 can register each of the (target) devices in the second (target) zone group, and the particular permissions, restrictions and other access control policies of each target device, with the zone manager 52. Such registration can be performed in any suitable manner, e.g., using any suitable device registration process. Once the registration step 88 has been completed, the zone manager 52 may configure and activate SAS zoning throughout the domain.

Regarding embodiments of the invention as described hereinabove, as an example, consider an example SAS domain with a relatively simple topology. The SAS domain includes a single switch, which forms the ZPSDS. The SAS domain also includes four initiator devices, which are coupled directly to the switch, and two JBOD (Just a Bunch Of Disks) storage enclosures, which also are coupled directly to the switch. Each JBOD includes two expanders and four target disk drive devices.

According to embodiments of the invention, using the initiator isolation application 54, such as the example shown in the method 60 and described hereinabove, the ZPSDS entry point phys upstream of the four initiators reside in a first (initiator) zone group (e.g., Zone#010). Also, the ZPSDS entry point phys upstream of the eight targets reside in a second (target) zone group (e.g., Zone#011). With regard to access control policies, the devices connected to, or downstream from, phys in Zone#010 have permission to communicate with devices connected to, or downstream from, phys in Zone#011, and vise versa. However, devices connected to, or downstream from, phys in Zone#010 or Zone#011 do not have permission to communicate with other devices connected to, or downstream from, phys in their own zone group. That is, devices connected to, or downstream from, phys in Zone#010 do not have permission to communicate with other devices connected to, or downstream from, phys in Zone#010. Also, devices connected to, or downstream from, phys in Zone#011 are restricted from communicating with other devices connected to, or downstream from, phys in Zone#011.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for managing SAS zoning within an SAS domain including at least one initiator device, at least one zoning expander device coupled to the initiator device and at least one target device coupled to the zoning expander device, the method comprising the steps of:
   assigning all of the initiator devices in the SAS domain to a first initiator zone group;
   assigning all of the target devices in the SAS domain to a second target zone group; and
   establishing an access control policy in which each of the initiator devices assigned to the first initiator zone group can communicate with each of the target devices assigned to the second target zone group but no initiator devices assigned to the first initiator zone group can communicate with any other initiator devices assigned to the first initiator zone group.

2. The method as recited in claim 1, wherein each of the devices in the SAS domain includes attachment information, and wherein the method includes the step of determining whether each of the devices in the SAS domain is an initiator device or a target device based on the attachment information of the device.

3. The method as recited in claim 1, wherein the initiator devices and the target devices each include attachment information, wherein the first initiator zone group assigning step includes adding at least a portion of the attachment information of the initiator devices in the SAS domain to the first initiator zone group, and wherein the second target initiator zone group assigning step includes adding at least a portion of the attachment information of target devices in the SAS domain to the second target zone group.

4. The method as recited in claim 3, wherein the attachment information of a device includes at least one of the SAS address of the device, the zoned portion of a service delivery subsystem (ZPSDS) entry point of the device, and the phy of the zoning expander device in the SAS domain that is closest to the device.

5. The method as recited in claim 3, wherein the method includes the step of determining whether any attachment information within the first initiator zone group also resides in the second target zone group.

6. The method as recited in claim 1, wherein the access control policy establishing step includes isolating each of the initiator devices in the first initiator zone group from every other initiator device in the first initiator zone group.

7. The method as recited in claim 1, wherein the SAS domain includes a zone manager, and wherein the method includes the step of registering the first initiator zone group and the second target zone group with the zone manager.

8. The method as recited in claim 1, wherein the method includes the step of discovering a device in the SAS domain and determining whether the discovered device is an initiator device or a target device.

9. An SAS zoning management application apparatus for use in managing SAS zoning within an SAS domain including at least one initiator device, at least one zoning expander device coupled to the initiator device and at least one target device coupled to the zoning expander device, the apparatus comprising:
   an interface for coupling to at least one of the initiator devices and the zoning expander devices;
   a controller coupled to the interface and including at least a portion of an initiator isolation application,
   wherein the initiator isolation application is configured to
      assign all of the initiator devices in the SAS domain to a first initiator zone group,
      assign all of the target devices in the SAS domain to a second target zone group, and
      establish an access control policy in which each of the initiator devices assigned to the first initiator zone group can communicate with each of the target devices assigned to the second target zone group but no initiator devices assigned to the first initiator zone group can communicate with any other initiator devices assigned to the first initiator zone group.

10. The apparatus as recited in claim 9, wherein each of the devices in the SAS domain includes attachment information, and wherein the initiator isolation application is configured to determine whether each of the devices in the SAS domain is an initiator device or a target device based on the attachment information of the device.

11. The apparatus as recited in claim 9, wherein the initiator devices and the target devices each include attachment information, and wherein the initiator isolation application assigns the initiator devices in the SAS domain to the first initiator zone group by adding at least a portion of the respective attachment information of the initiator devices in the SAS domain to the first initiator zone group and assigns the target devices in the SAS domain to the second target zone group by adding at least a portion of the respective attachment information of the target devices in the SAS domain to the second target zone group.

12. The apparatus as recited in claim 11, wherein the attachment information of a device includes at least one of the SAS address of the device, the zoned portion of a service delivery subsystem (ZPSDS) entry point of the device, and the phys of the zoning expander device in the SAS domain that is closest to the device.

13. The apparatus as recited in claim 11, wherein the initiator isolation application is configured to determine whether any attachment information within the first initiator zone group also resides in the second target zone group.

14. The apparatus as recited in claim 9, the initiator isolation application is configured to establish the access control policy by isolating each of the initiator devices in the first initiator zone group from every other initiator device in the first initiator zone group.

15. The apparatus as recited in claim 9, wherein the SAS domain includes a zone manager, and wherein the initiator isolation application is configured to register the first initiator zone group and the second target zone group with the zone manager.

16. The apparatus as recited in claim 9, wherein the initiator isolation application is configured to discover a device in the SAS domain and determine whether the discovered device is an initiator device or a target device.

17. A computer readable medium storing instructions that carry out a method for managing SAS zoning within an SAS domain including at least one initiator device, at least one zoning expander device coupled to the initiator device and at least one target device coupled to the zoning expander device, the computer readable medium comprising:
   instructions for assigning all of the initiator devices in the SAS domain to a first initiator zone group;
   instructions for assigning all of the target devices in the SAS domain to a second target zone group; and
   instructions for establishing an access control policy in which each of the initiator devices assigned to the first initiator zone group can communicate with each of the target devices assigned to the second target zone group but no initiator devices assigned to the first initiator zone group can communicate with any other initiator devices assigned to the first initiator zone group.

18. The computer readable medium as recited in claim 17, wherein each of the devices in the SAS domain includes attachment information, and wherein the computer readable medium includes instructions for determining whether each of the devices in the SAS domain is an initiator device or a target device based on the attachment information of the device.

19. The computer readable medium as recited in claim 17, wherein the initiator devices and the target devices each include attachment information, wherein the instructions for assigning the initiator devices in the SAS domain to a first initiator zone group includes instructions for adding at least a portion of the attachment information of the initiator devices in the SAS domain to the first initiator zone group, and wherein the instructions for assigning the target devices in the SAS domain to a second target zone group includes instructions for adding at least a portion of the attachment information of target devices in the SAS domain to the second target zone group.

20. The computer readable medium as recited in claim 19, wherein the attachment information of a device includes at least one of the SAS address of the device, the zoned portion of a service delivery subsystem (ZPSDS) entry point of the device, and the phys of the zoning expander device in the SAS domain that is closest to the device.

* * * * *